United States Patent [19]

Geeck, III

[11] Patent Number: 4,487,294

[45] Date of Patent: Dec. 11, 1984

[54] BRAKE ASSEMBLY

[76] Inventor: Joseph S. Geeck, III, 6355 Jefferson Hwy., Harahan, La. 70123

[21] Appl. No.: 407,780

[22] Filed: Aug. 13, 1982

Related U.S. Application Data

[63] Continuation-in-part of Ser. No. 358,656, Mar. 16, 1982, abandoned, and Ser. No. 371,235, Apr. 23, 1982.

[51] Int. Cl.$^3$ ............................................. F16D 49/08
[52] U.S. Cl. ................................................. 188/77 R
[58] Field of Search ................... 188/77 R; 192/0.082, 192/0.094, 10, 11; 474/140, 144; 182/20

[56] References Cited

U.S. PATENT DOCUMENTS

| | | | |
|---|---|---|---|
| 2,520,835 | 8/1950 | England ............................. | 180/6.62 |
| 2,875,870 | 3/1959 | Mesrobian ......................... | 192/0.094 |
| 3,474,487 | 10/1969 | Resag et al. ...................... | 188/77 R |
| 3,583,531 | 6/1971 | Besoyan ............................ | 188/77 R |

Primary Examiner—Joseph F. Peters, Jr.
Assistant Examiner—D. Lynn Fugate
Attorney, Agent, or Firm—John F. Sieberth

[57] ABSTRACT

The assembly includes (a) a rotatable shaft, (b) one or more pulleys secured to the shaft, the pulley having tapered walls, and (c) a belt having tapered walls to match the taper of the pulley. The belt is mounted on an arm or other member preventing the belt from rotating with the pulley. The belt is positioned and mounted so that it can be brought into frictional, rotation-slowing or rotation-stopping engagement with the pulley when desired.

8 Claims, 4 Drawing Figures

BRAKE ASSEMBLY

REFERENCE TO RELATED APPLICATIONS

This application is a continuation-in-part of my prior copending applications Ser. No. 358,656, filed Mar. 16, 1982, now abandoned and Ser. No. 371,235, filed Apr. 23, 1982, the disclosures of both of which are incorporated herein by reference.

SUMMARY OF THE INVENTION

This invention is directed to the novel brake assemblies described in my earlier copending applications referred to above, and to uses for such brake assemblies. Thus in accordance with one embodiment of this invention, there is provided a brake assembly for slowing or stopping rotation of rotatable members powered by a prime mover which comprises (a) a rotatable shaft; (b) at least one pulley secured to said shaft, said pulley having inwardly tapered walls adapted to accommodate a matching belt having comparable tapered sides; (c) a belt having tapered sides comparable to the tapered walls of said pulley and adapted to fit into and frictionally engage said pulley; (d) means secured to said belt to prevent said belt from rotating with said pulley; and (e) means for bringing said belt into frictional, rotation-slowing/stopping engagement with said pulley.

Preferably, the belt is composed of an abrasion-resistant, flexible, relatively inelastic material. Belts made of reinforced elastomer commonly used as automotive fan belts and the like are particularly well suited for use in this invention. Such belts are tough, strong, and durable and have been found in actual practice to function very effectively in brake assemblies of this invention.

A feature of the invention is that the tapering of the pulley walls and matching tapering of the sides of the belt give very efficient braking. For example, high speed rotating shafts on lawn mowers have been stopped by brake assemblies of this invention within three seconds, and in some types of mowers in about one second. Furthermore, the brake assembly, which can utilize pulleys and belts that are readily available on the market, is very durable and trouble-free. No wear was noted even after a power lawn mower equipped with a brake assembly of this invention was operated for 100 hours with the brake frequently applied.

The belt may be sized and shaped so that only its tapered sides fit into and frictionally engage the pulley. This offers the advantage that when the brake is applied the belt tends to wedge itself into the space between the tapered walls of the rotating pulley and thereby it can very rapidly cause the pulley to stop rotating. Alternatively the belt may be shaped and sized so that a bottom wall (inner edge) is also adapted to frictionally engage the pulley when the belt is brought into frictional, rotation-slowing/stopping engagement with the pulley. This offers the advantage of increasing the amount of surface contact between the belt and the pulley and thus increases the area over which the frictional, rotation-slowing/stopping engagement can occur. At the same time some of the foregoing wedging action is achieved.

Another embodiment of this invention involves including in the above brake assembly means for interrupting the transmission of power from the prime mover to the shaft when the belt is brought into frictional, rotation-slowing/stopping engagement with the pulley. Preferred means for the purpose is a centrifugal clutch such as referred to in my copending application Ser. No. 371,235, filed Apr. 23, 1982.

Still another embodiment is to include in the brake assembly means for keeping the belt in a tangential position relative to the pulley when the belt is being engaged with and disengaged from the pulley. This offers the advantage of allowing the belt to achieve some wedging within the tapered walls of the pulley for highly efficient braking without at the same time permitting the belt to wedge itself to an excessive extent in the pulley. This feature has been found of paticular advantage when using the brake system for stopping rotation of heavy equipment, such as a small motorized four-wheeled cart-like vehicle of the type used at amusement parks and the like. For applications of this type it is preferable to include means which keep the belt out of frictional, rotation-slowing/stopping engagement with the pulley except when the belt is being applied for the purpose of slowing down or stopping rotation of the pulley. In other applications, such as use of the brake assembly for enhancing the safety of power mowers, the system preferably includes means which keep the belt in frictional, rotation-stopping engagement with the pulley except when the operator is manually actuating a handle, lever, foot pedal or the like. In this way, the blades are automatically stopped by the braking system moments after the operator releases his grip from the handle or lever, or ceases to depress the foot pedal. Systems of this type are described in my copending applications referred to at the outset.

Combinations of the various embodiments noted above are also included within the ambit of this invention.

Yet another embodiment of this invention is the utilization of the foregoing braking systems in various power-driven equipment including for example, power-driven vehicles such as scooters, bicycles, tricycles, four-wheeled cars and carts, tractors, motorcycles, etc. and power-driven machinery such as power saws, planers, drill presses, and the like.

These and other embodiments and features of the invention will become still further apparent from a consideration of the ensuing description, appended claims, and accompanying drawings.

DESCRIPTION OF PREFERRED EMBODIMENTS

Figure 1:
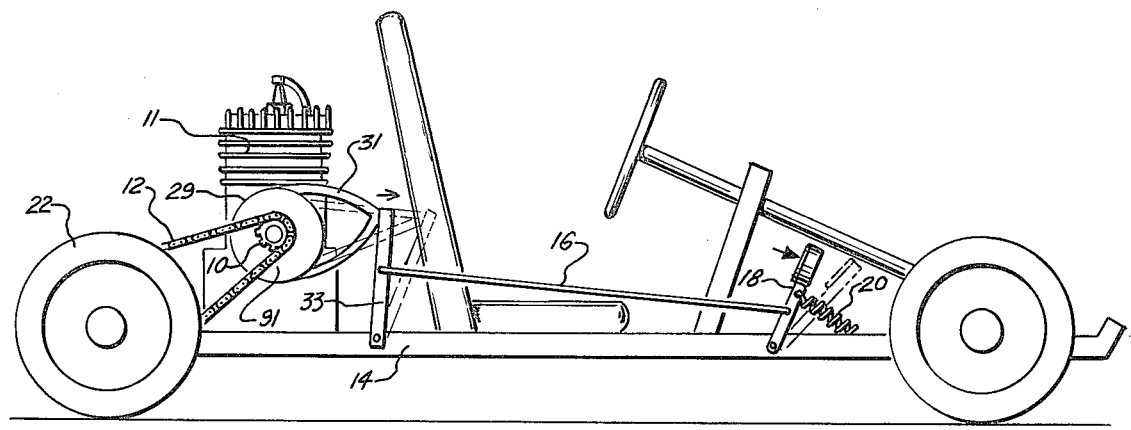
FIG. 1 is a side elevation of a four-wheeled, power-driven, cart-like vehicle equipped pursuant to this invention with a braking system in which the pulley is positioned around the periphery of a centrifugal clutch.

Referring now to the drawing wherein like parts are identified by like numerals, the brake assemblies as depicted comprise a stationery belt 31 secured to member or arm 33 and engageable with stop pulley 29 secured to shaft or axle 17 either directly or indirectly. In FIG. 2 pulley 29 is mounted directly on axle 17. In contrast, in FIG. 1 pulley 29 is positioned around the periphery of centrifugal clutch 91 which in turn is mounted on its upstream side to the drive shaft (not shown) of engine 11. Sprocket wheel 10 is mounted on the downstream side of clutch 91 and carries chain drive 12 which in turn engages another sprocket wheel 30 (not shown in FIG. 1) mounted on axle 17. Thus FIG. 1 illustrates an arrangement involving indirect securing of pulley 29 to axle 17.

Arm 33 is pivotally mounted on frame member 14 of the vehicle. Attached to arm 33 is brake rod 16, the other end of which is secured to brake pedal 18. Depression of pedal 18 is opposed or resisted by coil spring 20 (a compression spring) which forces pedal 18 to its original position (as shown) when the operator releases foot pressure from the pedal.

Figure 2:
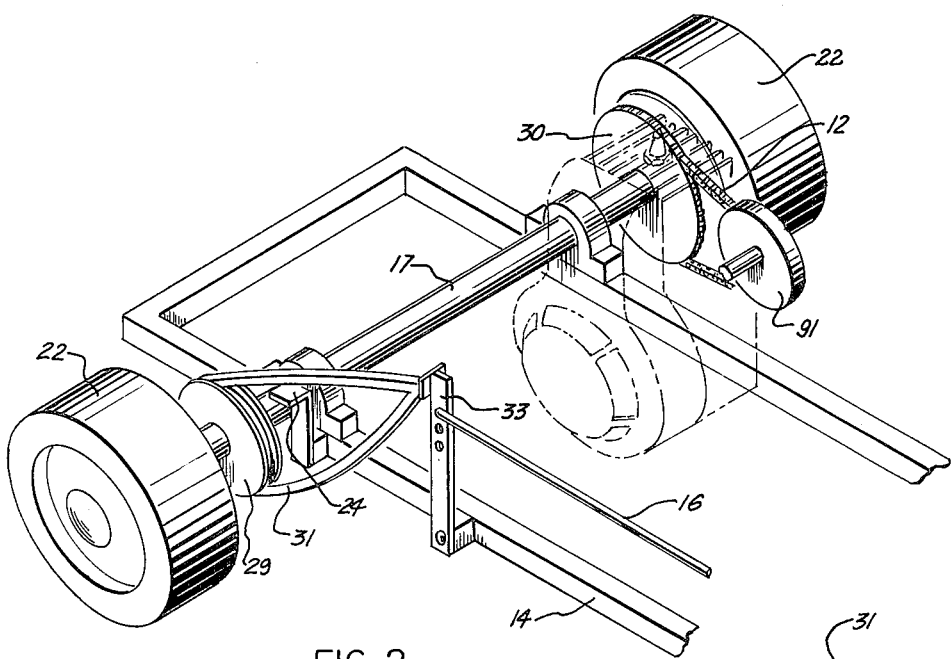
FIG. 2 is a fragmented view in perspective of the rear portion of a vehicle of the type of FIG. 1, but in this instance equipped with a braking system of this invention in which the pulley is positioned directly on the rear axle of the vehicle.

As depicted in FIGS. 1 and 2, when foot pedal 18 is not depressed by the operator, there is some slack between stationery belt 31 and stop pulley 29 and thus the braking system does not interfere with the operation of the vehicle. In particular, engine 11 is free to drive the rear wheels 22,22 by means of rotation applied by its drive shaft to centrifugal clutch 91 which when in engagement because of the outward thrusting of its interiorly-positioned rotated weights into the drum on its downstream side by the centrifugal force of these rotated weights, drives sprocket wheel 10, chain drive 12, sprocket wheel 30 and axle 17.

Figures 3, 4:
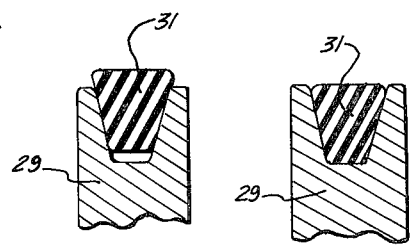
FIG. 3 is a fragmented cross-section of a pulley and belt of a braking system of this invention in which only the tapered sides of the belt frictionally engage the tapered walls of the pulley.
FIG. 4 is a fragmented cross-section of a pulley and belt of a braking system of this invention in which a bottom wall (inner edge) and the tapered sides of the belt frictionally engage the pulley.

When the operator depresses foot pedal 18 the pull applied to brake rod 16 pulls arm 33 to a forward position in which the stationery belt has been drawn tight around stop pulley 29 so that frictional engagement occurs at least between the tapered sides of belt 31 and the tapered walls of pulley 29 (note FIG. 3) so that the rotation of axle 17 is slowed down or stopped as desired. As indicated in FIG. 4, this frictional engagement can be caused to include the bottom wall (inner edge) of belt 31 and the bottom of the rim of pulley 29 as well as the tapered sides and tapered walls of these cooperative members.

To keep belt 31 from wedging too tightly into pulley 29 during such braking operations, arm 24 is mounted on frame member 14 in proximity to the inner edge of the belt so that the inner edge of the belt can ride thereon during application of the braking system.

At the same time the brake is applied the speed of engine 11 is reduced in any suitable manner to an idling speed. The reduction in rotational speed causes the centrifugal weights in centrifugal clutch 91 to be retracted inwardly away from the drum on the downstream side of the clutch so that the weights are disengaged from the drum. One conventional arrangement is to include in the vehicle an accelerator pedal and conventional linkage (not shown) to the carburetor of engine 11 which causes the engine to speed up when the accelerator pedal is depressed, and which allows or causes the engine to resume operation at idle speed when the accelerator pedal is released (for example, when brake pedal 18 is being depressed).

When the operator releases brake pedal 18 coil spring 20 pushes pedal 18, brake rod 16 and arm 33 to a position such as shown in the Figures wherein belt 31 is no longer in frictional, rotation-slowing/stopping engagement with pulley 29.

It will of course be apparent that more than one belt/pulley braking system of this invention may be utilized in any application in which two or more such braking systems would be necessary or are desirable.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

I claim:

1. A brake assembly for slowing or stopping rotation of rotatable members powered by a prime mover which comprises:
    (a) a rotatable shaft;
    (b) at least one pulley secured to said shaft, said pulley having inwardly tapered walls adapted to accommodate a matching belt having comparable tapered sides;
    (c) a belt composed of abrasion-resistant, flexible, relatively inelastic material, said belt having tapered sides comparable to the tapered walls of said pulley and being adapted to fit into and frictionally engage said pulley;
    (d) means secured to said belt to prevent said belt from rotating with said pulley;
    (e) engagement means for bringing said belt into frictional, rotation-slowing/stopping engagement with said pulley; and
    (f) means adapted to keep said belt in a tangential position relative to the pulley when the belt is being engaged with and disengaged from said pulley.

2. The apparatus of claim 1 wherein said material comprises a reinforced elastomer.

3. The apparatus of claim 1 further including means keeping said belt out of frictional, rotation-slowing/stopping engagement with said pulley except when said engagement means is being actuated.

4. In a wheeled vehicle powered by a prime mover, the improvement pursuant to which said vehicle includes a brake assembly comprising:
    (a) an axle adapted for carrying at least one wheel of the vehicle;
    (b) at least one pulley secured to said axle, said pulley having inwardly tapered walls adapted to accommodate a matching belt having comparable tapered sides;
    (c) a belt composed of abrasion-resistant, flexible, relatively inelastic material, said belt having tapered sides comparable to the tapered walls of said pulley and being adapted to fit into and frictionally engage said pulley;
    (d) means secured to said belt to prevent said belt from rotating with said pulley;
    (e) engagement means for bringing said belt into frictional, rotation-slowing/stopping engagement with said pulley; and
    (f) means adapted to keep said belt in a tangential position relative to the pulley when the belt is being engaged with and disengaged from said pulley.

5. The apparatus of claim 4 wherein said material comprises a reinforced elastomer.

6. The apparatus of claim 4 further including means keeping said belt out of frictional, rotation-slowing/- stopping engagement with said pulley except when said engagement means is being actuated.

7. The apparatus of claim 4 wherein said pulley is secured directly to said axle.

8. The apparatus of claim 4 wherein said pulley is secured indirectly to said axle.

* * * * *